(12) United States Patent
Carter (10) Patent No.: US 8,108,402 B2
(45) Date of Patent: Jan. 31, 2012

(54) TECHNIQUES FOR MEASURING THE RELEVANCY OF CONTENT CONTRIBUTIONS

(75) Inventor: Stephen R Carter, Spanish Fork, UT (US)

(73) Assignee: Oracle International Corporation, Redwood Shores, CA (US)

( * ) Notice: Subject to any disclaimer, the term of this patent is extended or adjusted under 35 U.S.C. 154(b) by 536 days.

(21) Appl. No.: 12/253,043

(22) Filed: Oct. 16, 2008

(65) Prior Publication Data

US 2010/0100554 A1    Apr. 22, 2010

(51) Int. Cl.
*G06F 17/30* (2006.01)
(52) U.S. Cl. .................. 707/748; 707/609; 707/749
(58) Field of Classification Search .................. 707/705, 707/723, 728, 609, 748, 749; 709/204
See application file for complete search history.

(56) References Cited

U.S. PATENT DOCUMENTS

| 7,171,626 | B2 | 1/2007 | Sheldon et al. | |
|---|---|---|---|---|
| 7,324,990 | B2* | 1/2008 | Jaschek et al. | 1/1 |
| 7,353,235 | B2 | 4/2008 | Sally et al. | |
| 7,409,645 | B2 | 8/2008 | Sheldon et al. | |
| 7,426,700 | B2 | 9/2008 | Sheldon et al. | |
| 2005/0086215 | A1 | 4/2005 | Perisic | |
| 2005/0154746 | A1 | 7/2005 | Liu et al. | |
| 2007/0005588 | A1 | 1/2007 | Zhang et al. | |
| 2007/0073690 | A1 | 3/2007 | Boal et al. | |
| 2007/0156748 | A1* | 7/2007 | Emam et al. | 707/102 |
| 2007/0179945 | A1 | 8/2007 | Marston et al. | |
| 2008/0104061 | A1 | 5/2008 | Rezaei | |
| 2008/0104172 | A1* | 5/2008 | Craig | 709/204 |
| 2010/0169273 | A1* | 7/2010 | Callanan et al. | 707/609 |

* cited by examiner

*Primary Examiner* — Jean M Corrielus
(74) *Attorney, Agent, or Firm* — Kilpatrick Townsend & Stockton LLP (57) ABSTRACT

Techniques for measuring the relevancy of content contributions are provided. Relevancy measurements for components of a collection of content are obtained. The relevancy measurements, the components to which they relate, and the collection of content as a whole are organized into a graphical presentation for subsequent analysis of the components vis-à-vis the collect of content as a whole.

7 Claims, 5 Drawing Sheets

TECHNIQUES FOR MEASURING THE RELEVANCY OF CONTENT CONTRIBUTIONS

BACKGROUND

Increasingly the Internet is being used by individuals and enterprises as "the source" (authority) of information. For example, individuals regularly rely on content posted to wiki sites on the Internet without consideration to the fact that content posted there is not controlled and much of it can be specious. As another example, an employer often "Googles" a prospective employee (search for a person in the Google® search engine over the Internet) for purposes of doing research on that individual before an interview takes place with that individual. In this latter example, it seems little regard is given to that fact that content about an individual may have been maliciously placed there by others and may be entirely one sided and inaccurate. In fact, an interviewer may not even raise any issue found during a Google®, which is even worse for an interviewee because the interviewee is unaware of a predisposed biased held by the interviewer during the interview.

The problem is compounded with the rise of collaboration and virtual communities over the Internet. Here, the true identity of an author may be a real issue. That is, a single individual can assume a variety of personas during collaboration on content and appear to others to be entirely different individuals. The individual has an interest in preserving his/her anonymity whereas others have an interest in not being duped and in recognizing that multiple different content submissions as coming from a single virtual community member.

Content continues to grow at a phenomenal pace on the Internet as do the number of users; although the number of users is no indication as to the true growth in unique individuals that are appearing on the Internet (because one individual can assume multiple personas). So, the problem associated with validating content and associating it with particular individuals is becoming a daunting issue.

Moreover, even if content and attributors to that content were capable of being successfully identified and correlated, there is no mechanism to efficiently and coherently depict the trend or changes of such correlations over a corpus of content. Thus, digesting any such information can become an impractical exercise.

Therefore, improved techniques are needed for more efficiently determining contributions to and value assignments of content.

SUMMARY

In various embodiments, techniques for measuring the relevancy of content contributions are provided. More specifically, and in an embodiment, a method is provided for measuring the relevancy of content contributions. A collection of content is evaluated against a relevancy statement. Components of the content are scored with relevancy values in view of evaluation of the relevancy statement. Finally, the components with their relevancy values vis-à-vis the collection of content as a whole are represented as a presentation for subsequent analysis.

DETAILED DESCRIPTION

A "resource" includes a user, content, a processing device, a node, a service, an application, a system, a directory, a data store, groups of users, combinations of these things, etc. Resources can interact with each other and can either act on other resource or be acted upon by other resources. The term "service" and "application" may be used interchangeably herein and refer to a type of software resource that includes instructions, which when executed by a machine performs operations that change the state of the machine and that may produce output.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "collection of content" refers to electronic discussions or threads about or for a particular resource, current event, past event, future event, technology, product, service, etc. Essentially, the collection of content can be related to any custom-defined topic or subject desired. The content can include text, images, graphics, video, audio, or various combinations of these things. The collection of content is selectively culled from one or more corpora of data, such as but not limited to the Internet, private or personal repositories of content, virtual communities, and/or various combinations of these things.

A "component" of the collection of content refers to a particular contribution or authored piece of content that belongs to or is associated with the collection of content.

A "relevancy value" refers to a numerically assigned value (digit, percentage, real number) or unique string value belong to a predefined scale of string values that is resolved for a particular component vis-à-vis a predefined relevancy statement. The "relevancy statement" can be the confidence factor of the component originating from a particular identity of an author (type of resource), collection of identities assumed by an author, and/or selective identities for a group of users or an organization. Moreover, the statement can include an accuracy (degree of precision) factor that a particular component is more or less relevant to the topic or subject assigned to the collection of content as a whole. Still further, the statement can include an accuracy factor that a particular component is more or less relevant to a search criteria that defines and that may have been used to assemble the collection of content or identify the collection of content. It is noted that the relevancy statement can be a composite statement that includes one or more different types of statements defined above as well.

Furthermore, a single relevancy value can include multiple assigned values, each value representing a different aspect of a component's relevancy. Other example relevancy values include aggregate values for movements from a present relevancy value when compared to a previously assigned relevancy value and a historical value for showing movement from a previously assigned historical value to a present assigned historical value. The historical value accounts for the movement of all components and their relevancy to a topic or a subject of the collection of content from one state of the collection of content to a next state in the collection of content.

Various embodiments of this invention can be implemented in existing network architectures, security systems, operating systems, directory systems, data centers, applications, search engines, World-Wide Web (WWW) browsers, and/or communication devices. Any particular architectural layout or implementation presented herein is provided for purposes of illustration and comprehension only and is not intended to limit aspects of the invention.

It is within this context, that various embodiments of the invention are now presented with reference to the FIGS. 1-4 and 5A-5D.

Figure 1:
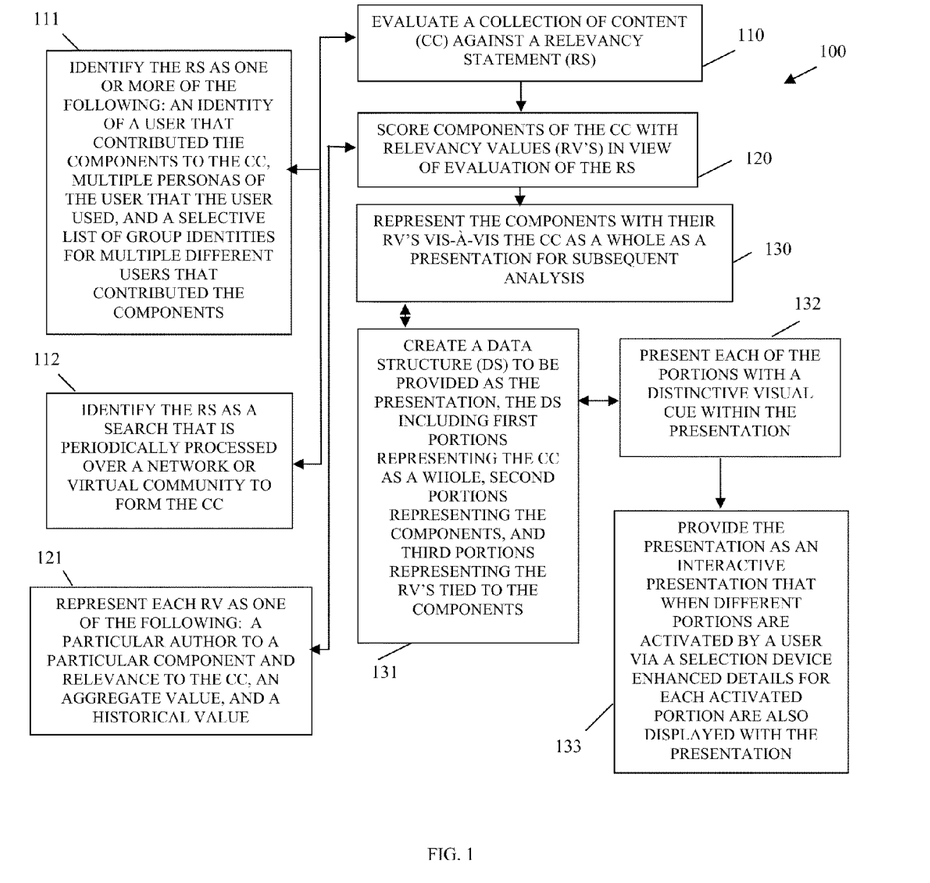
FIG. 1 is a diagram of a method for measuring the relevancy of content contributions, according to an example embodiment.

FIG. 1 is a diagram of a method for measuring the relevancy of content contributions, according to an example embodiment. The method 100 (hereinafter "content relevancy metering service") is implemented as instructions in a machine-accessible and computer-readable storage medium. The instructions when executed by a machine (computer or processor-enabled device) perform the processing depicted in FIG. 1. The content relevancy metering service is also operational over and processes within a network. The network may be wired, wireless, or a combination of wired and wireless. In an embodiment, the network is the Internet.

At 110, the content relevancy metering service evaluates a collection of content against a relevancy statement. In an embodiment, the collection of content includes a plurality of components. Each component representing a contribution to a topic or subject associated with the content.

The collection of content can be static corpus of content or it can be a dynamically evolving corpus of content. In instances where the collection is static, the content relevancy metering service can be executed in a batch mode to mine the content in the manners discussed herein and below. In instances where the collection is dynamically evolving, the content relevancy metering service can be executed each time a component is added to the collection, at predefined intervals, or in accordance with policy or raised events.

Moreover, the collection can be monitored from the entire Internet, from specific sites of the Internet, from personal repositories, from enterprise repositories, from selective virtual communities, or various combinations of these things. The location(s) of the collection can be configured. As can the topic or subject associated with the collection.

In an embodiment, at 111, the content relevancy metering service identifies the relevancy statement as one or more of the following: an identity of a user that contributed to the components to the collection of content, multiple personas (multiple alias identities and the true identity (note that these can be semantic, crafted, or attested identities)) that the user used to contribute the components, and/or a selective list of group identities for multiple different users that contributed the components to the collection of content. So, a list can be used to represent how a group contributes as a whole via the components to the collection of content being evaluated.

According to an embodiment, at 112, the content relevancy metering service identifies the relevancy statement as a search having predefined search criteria (search operands and operator(s)). The search is periodically processed over a network or virtual community to form the collection of content. This is a dynamically evolving scenario for the collection of content. Other situations exist as well where the search is processed in batch over a static collection of content.

At 120, the content relevancy metering service scores the components of the collection of content with relevancy values in view of the evaluation of the relevancy statement. Here, each component can have one or more relevancy values. Moreover, a single relevancy value can be a composite value representing different relevancy factors.

In an embodiment, at 121, the content relevancy metering service represents each relevancy value (or factors within the value) as one or more of the following: a particular author (identity or identities for a same entity) of the components and that particular component's relevancy to the collection of content, a present aggregate value representing an aggregated amount of movement in a particular relevancy value presently being assigned in relation to a last assigned aggregate value associated for a last relevancy value, and/or a historical movement value representing another amount for a historical value for relevancy of the components contributed by the particular author and other components of the collection contributed by other authors to the collection in relation to a last assigned historical value.

It is noted that a variety of techniques can be used to determine relevancy. For example, a particular component can be parsed for words and phrases. Noise words can be removed, such as "the," "a", "and," etc. The words can be stemmed to the morphological roots and a thesaurus or multiple thesauri used to augment the stemmed words and phrases. Each of these remaining words and phrases can also include a frequency count for the number of times a particular word occurs within the component. This information can then be compared to a model component associated with the collection as a whole and scored relative to the remaining components in the collection. The result is a relevancy for the component being evaluated. It is noted this is but one scenario and others exist that can benefit from the teachings presented herein and above.

At 130, the content relevancy metering service represents the components with their relevancy values in relation to the collection of content as a whole as a presentation for subsequent analysis. This presentation can be achieved in a variety of manners. Some example presentations are presented in more detail below with reference to the FIGS. 5A-5D.

As another example, at 131, the content relevancy metering service creates a data structure to be provided as the presentation or used to derive the presentation. The data structure includes first portions representing different aspects of the collection of content as a whole. The data structure also includes second portions that represent the components. Still further the data structure includes third portions representing the relevancy values tied to the components.

Continuing with the embodiment at 131 and at 132, the content relevancy metering service presents each of the portions (first, second, and third) with a distinctive visual cue within the presentation. Some example visual cues include, but are not limited to, distinctive and unique colors, gradations of a same color, lines, arrows, different characteristics and sizes for geometric shapes and lines, numeric values, labels, etc. Again some of these visual cues are presented below with the sample presentations depicted in the FIGS. 5A-5D.

Continuing with the embodiment at 132 and at 133, the content relevancy metering service provides the presentation as an interactive presentation such that when different portions are activated by a user via a selection device (e.g., digital pen, wand, mouse, laser pointer, infrared pointer, etc.) enhanced details for each activated portion are displayed with the presentation. In fact, in some cases the actual component (piece of content) can be dynamically lined to the presentation and retrieved from the presentation via a selection. Even audio or video can be activated from the presentation. In some cases, a user can augment the presentation with his/her comments or additions. The augmented information can be hidden, subject to security restrictions, and/or also depicted via another visual cue within the presentation indicating its presence with a particular component. So the presentation can become a research of evaluation of the collection and the components of the collection and can be interactive.

Figure 2:
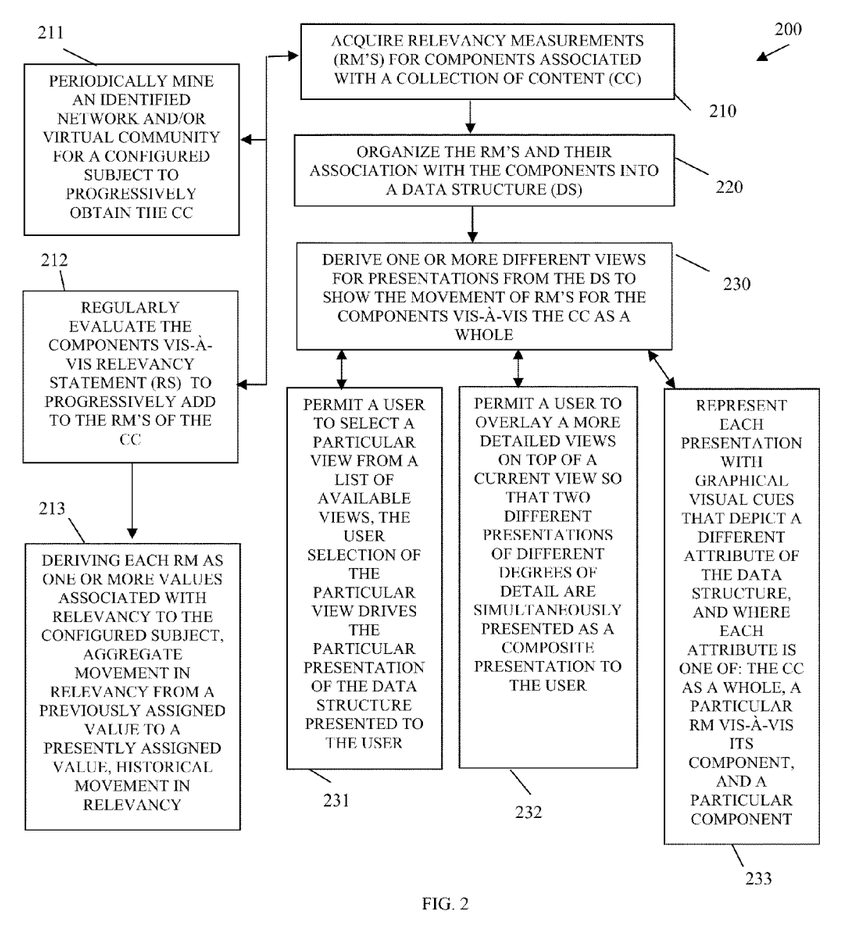
FIG. 2 is a diagram of another method for measuring the relevancy of content contributions, according to an example embodiment.

FIG. 2 is a diagram of another method for measuring the relevancy of content contributions, according to an example embodiment. The method 200 (hereinafter "content relevancy presentation service" is implemented in a machine-accessible and readable medium as instructions. The instructions when executed by a machine perform the processing depicted in the FIG. 2. Moreover, the content relevancy presentation service is operational over a network, and the network may be wired, wireless, or a combination of wired and wireless.

The content relevancy presentation service represents another and in some cases enhanced perspective to the content relevancy metering service represented by the method 100 of the FIG. 1.

At 210, the content relevancy presentation service acquires relevancy measurements (relevancy values) for components (pieces of content) associated with a collection of content.

According to an embodiment, at 211, the content relevancy presentation service periodically mines an identified network and/or virtual community (can be a chat group or enterprise wiki, etc.) for a configured subject or topic (can be a thread of discussion). This is done to progressively and dynamically obtain the collection of content that is regularly being added to by contributors.

In another cases, at 212, the content relevancy presentation service regularly evaluates the components in relation to a relevancy statement to progressively and dynamically add to the relevancy measurements of the collection of content.

Continuing with the embodiment at 212 and at 213, the content relevancy presentation service derives each relevancy measurement as one or more values associated with relevancy to a configured subject, aggregated movement in relevancy from a previously assigned value to a presently assigned value, and/or historical movement in relevancy.

At 220, the content relevancy presentation service organizes the relevancy measurements and their corresponding associations with their components into a data structure.

At 230, the content relevancy presentation service derives one or more different views for presentations from the data structure to show movement (can also be trend analysis) of the relevancy measurements for the components in relation to the collection of content as a whole. So, each component includes attributes within the data structure and those attributes are the relevancy measurements. It is noted that the collection as a whole also has attributes (relevancy measurements) and it is not just the individual components.

In an embodiment, at 231, the content relevancy presentation service permits a user to select a particular view from a list of available and predefined views. The user's selection of the particular view drives the particular presentation of the data structure that is presented to the user.

In another case, at 232, the content relevancy presentation service permits a user to overlay one or more detailed views on top of a currently selected view so that two different presentations of different degrees of detail are simultaneously presented as a composite presentation to the user. So, overlay increasing levels of detail can be achieved.

In yet another situation, at 233, the content relevancy presentation service represents each presentation with graphical visual cues that depict a different attribute (relevancy measure) of the data structure. Each attribute depicts a relevancy measurement(s) for one of: the collection of content as a whole, a particular relevancy measurement in relation to its component, and a particular component.

Figure 3:
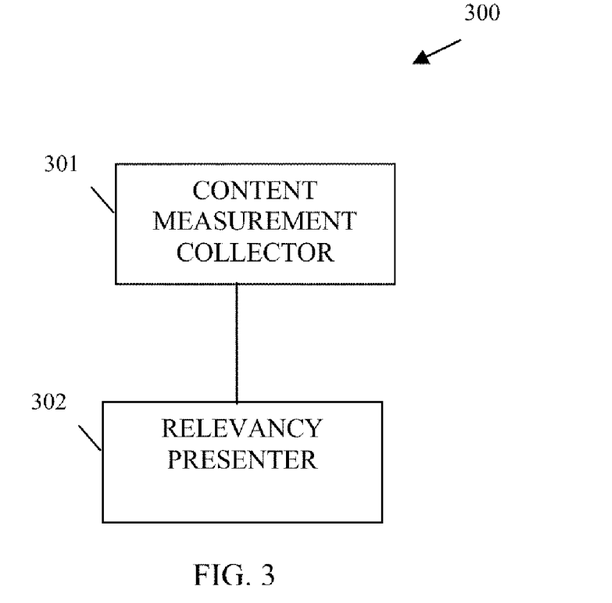
FIG. 3 is a diagram of content contribution measuring system, according to an example embodiment.

FIG. 3 is a diagram of content contribution measuring system 300, according to an example embodiment. The content contribution measuring system 300 is implemented as instructions on or within a machine-accessible and computer-readable storage medium. The instructions when executed by one or more machines (computer(s) or processor-enabled device(s)) perform various aspects of the processing depicted with respect to the methods 100 and 200 of the FIGS. 1 and 2, respectively. The content contribution measuring system 300 is also operational over a network and the network may be wired, wireless, or a combination of wired and wireless.

The content contribution measuring system 300 includes a content measurement collector 301 and a relevancy presenter 302. Each of these will now be discussed in turn.

The content measurement collector 301 is implemented in a computer-readable storage medium as instructions that process on a machine (computer or processor-enabled device)

over the network. Example aspects of the content measurement collector 301 were presented above in detail with reference to the methods 100 and 200 of the FIGS. 1 and 2, respectively.

The content measurement collector 301 collects relevancy measurements for component contributions made to a collection of content. Moreover, the content measurement collector 301 also supplies the relevancy measurements to the relevancy presenter 302.

In an embodiment, the relevancy measurements are made by evaluating each component contribution in relation to a relevancy statement.

In another case, the relevancy measurements are at least partially acquired by the content measurement collector 301 via one or more third-party services. So, off-the-shelf or custom relevancy measuring services can be consulted by the content measurement collector 301 to provide the content measurement collector 301 the relevancy measurements.

In some situations, a portion of the collection of content is periodically culled from an identified virtual community or collection of virtual communities. Also, at least some of those component contributions are particular non-posted contributions residing in a repository under the control of a particular user who wants to forecast how the particular non posted contributions are to be viewed within the virtual community or within the collection of virtual communities via particular relevancy measurements assigned to those particular non posted contributions. In other words, the system 300 and the methods 100 and 200 of the FIGS. 1 and 2, respectively, can be used as a forecasting tool. This may be particular useful to management within an enterprise to forecast how investors will receive information the enterprise is releasing to inventors. It can also be useful to authors or contributors trying to proactively manager their reputations within a virtual community. In fact, it can be useful for a variety of reasons only some of which were discussed above.

The relevancy presenter 302 is implemented in a computer-readable storage medium as instructions that process on a machine (computer or processor-enabled device) over the network. Example aspects of the relevancy presenter 302 were presented above in detail with reference to the methods 100 and 200 of the FIGS. 1 and 2, respectively.

The relevancy presenter 302 organizes and visually presents each component along with its relevancy measurement(s) in relation to the collection of content as a whole. This permits rapid visual depiction and user comprehension of the each component in relation to the collection of content as a whole.

According to an embodiment, the relevancy presenter 302 receives instructions from a user to custom define graphical visual cues and attributes for each component, relevancy measurement, and the collection of content as a whole. The custom defined graphical visual cues and attributes are organized as a presentation that is presented to the user on a display device of the user.

Figure 4:
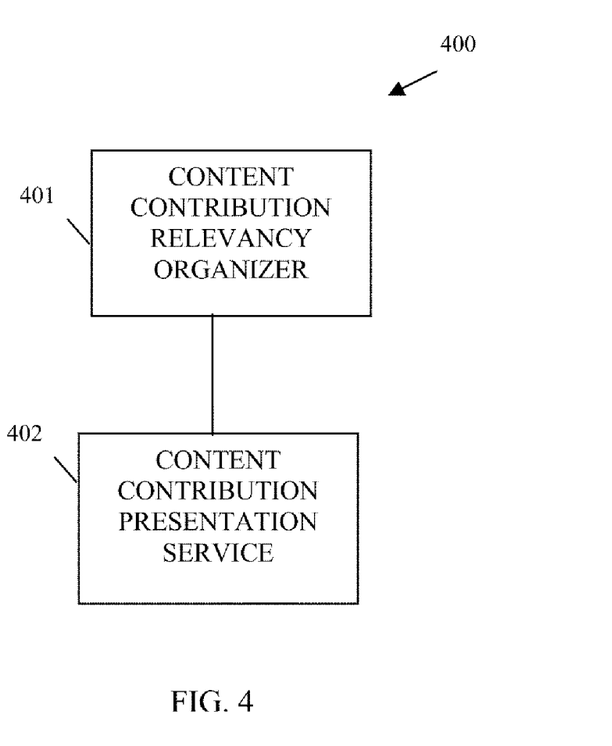
FIG. 4 is a diagram of another content contribution measuring system, according to an example embodiment.

FIG. 4 is a diagram of another content contribution measuring system 400, according to an example embodiment. The content contribution measuring system 400 is implemented as instructions on or within a machine-accessible and computer-readable storage medium. The instructions when executed by one or more machines (computer(s) or processor-enabled device(s)) perform various aspects of the processing depicted with respect to the methods 100 and 200 of the FIGS. 1 and 2, respectively; and the system 300 of the FIG. 3. The content contribution measuring system 400 is also operational over a network and the network may be wired, wireless, or a combination of wired and wireless The content contribution measuring system 400 includes a content contribution relevancy organizer 401 and a content contribution presentation service 402. Each of these components and their interactions with one another will now be discussed in turn.

The content contribution relevancy organizer 401 is implemented in a computer-readable storage medium as instructions that process on a machine (computer or processor-enabled device) over the network. Example aspects of the content contribution relevancy organizer 401 were presented above with reference to the methods 100 and 200 of the FIGS. 1 and 2, respectively, and with reference to the system 300 of the FIG. 3.

The content contribution relevancy organizer 401 assembles a data structure within the computer-readable storage medium to represent a collection of content as a whole, contributions made to that collection of content that are made from a particular contributor (can be multiple identities for the same individual or can be multiple identities for different individuals associated with a group), and relevancy measurements assigned to each of the contributions.

According to an embodiment, the content contribution relevancy organizer 401 organizer updates the data structure when new contributions and new relevancy measurements are detected for the collection of content.

The content contribution presentation service 402 is implemented in a computer-readable storage medium as instructions that process on a machine (computer or processor-enabled device) over the network. Example aspects of the content contribution presentation service 402 were presented above with reference to the methods 100 and 200 of the FIGS. 1 and 2, respectively, and with reference to the system 300 of the FIG. 3.

The content contribution presentation service 402 processes the data structure to produce custom presentations that uniquely identify each portion of the data structure relative to remaining portions of that data structure.

In an embodiment, the content contribution presentation service 402 provides an interface to a user for custom defining a number of the presentations. So, the level of detail and how that level of detail is presented can be customized by a user via the interface.

In another embodiment, the content contribution presentation service 402 provides an interface to the user for the user to select a number of predefined presentations.

In still another case, the content contribution presentation service 402 provides an interface to the user for the user to overlay multiple different presentations into a single composite presentation. So, one presentation can be overlaid on top of one or more base presentations to make one composite presentations.

In still other situations, the presentation is interactive, such that a user can interact directly with the presentation to acquire other additional information and details about the collection of content and the contributions.

FIGS. 5A-5D are sample visual presentations of contributions to content, according to example embodiments. It is noted that other presentations may be developed with the various methods and systems presented herein and above and that the sample presentations presented with the FIGS. 5A-5D are presented for illustrative purposes only to assist in visualizing the presentations that can be achieved. Moreover, it is noted that the presentations can and often will include varying degrees of color gradation and that the grayscale presented in FIGS. 5A-5D does not so limit the presentations depicted.

Figure 5A:
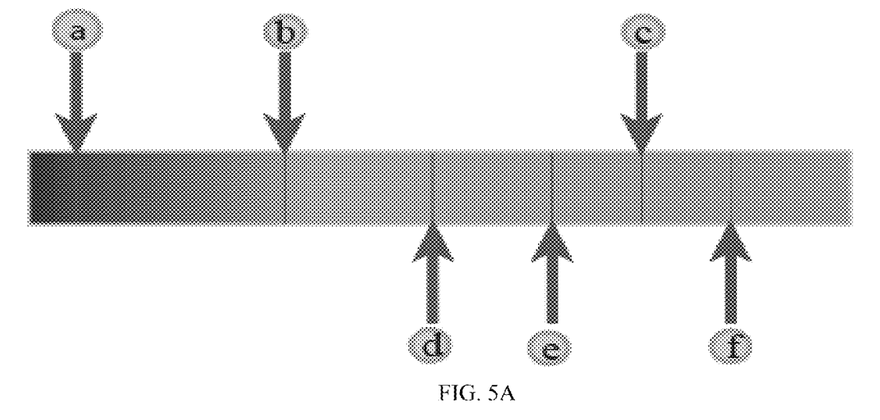
FIGS. 5A-5D are sample visual presentations of contributions to content, according to example embodiments.

The FIG. 5A shows a presentation where the collection of content is represented as the rectangular box. The degree of accuracy is shown in varying shades of gray, where the leftmost portion of the rectangle is the least relevant subset of the collection of content and the rightmost portion the most relevant or accurate subset of the collection of content. Moreover, the labels "a," "b," "c," "d," "e," and "f" show the relevance of a particular person's (can be multiple personas for the same person or identity) contribution to the discussion or threads (collection of content). In an embodiment, "a," "b," "c," "d," "e," and "f" may be different personas for comparative purposes, such an embodiment also applies to FIGS. 5B-5D.

The FIG. 5B again shows a presentation where the collection of content is represented as the rectangular box. Again, the degree of accuracy is shown in varying shades of gray, where the leftmost portion of the rectangle is the least relevant subset of the collection of content and the rightmost portion the most relevant or accurate subset of the collection of content.

Figure 5B:
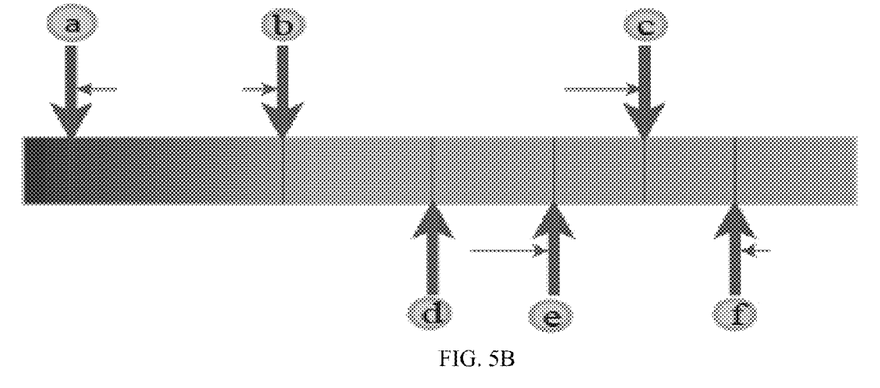

The labels "a," "b," "c," "d," "e," and "f" show the relevance of the person's contribution to the discussion or threads (collection of content) and the small arrows show the aggregate movement of the relevance, where the length of the arrow line shows the magnitude of movement since the last evaluation. In an embodiment several arrows and lines may be displayed showing change over time. In an embodiment, the thickness of the smaller arrows can be relative to the sample population or the statistical impact of the sample population that was used to determine the movement (e.g., only one sample showing "a" movement would be of less importance than, say, 1000 samples that indicated "f" movement). This distinction can be made in all of the following embodiments presented herein.

Figure 5C:
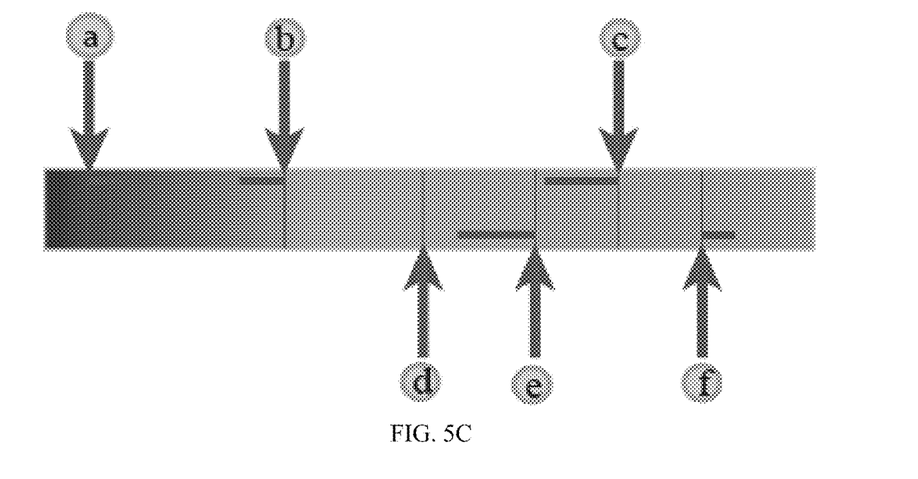

The FIG. 5C shows a presentation where the collection of content is represented as the rectangular box. Again, the degree of accuracy is shown in varying shades of gray, where the leftmost portion of the rectangle is the least relevant subset of the collection of content and the rightmost portion the most relevant or accurate subset of the collection of content.

The labels "a," "b," "c," "d," "e," and "f" show the relevance of the person's contribution to the discussion or threads (collection of content) and the small lines in the colored bar show the aggregate movement of the relevance where the length of the line shows the magnitude of movement since the last evaluation. In an embodiment, several arrows and lines may be displayed showing change over time.

Figure 5D:
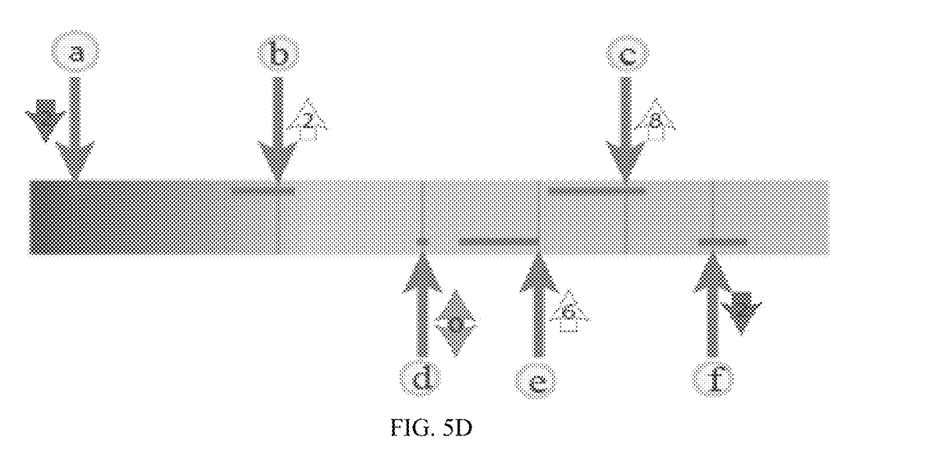

The FIG. 5D shows a presentation where the collection of content is represented as the rectangular box. Again, the degree of accuracy is shown in varying shades of gray, where the leftmost portion of the rectangle is the least relevant subset of the collection of content and the rightmost portion the most relevant or accurate subset of the collection of content.

The labels "a," "b," "c," "d," "e," and "f" show the relevance of the person's contribution to the discussion or threads (collection of content) and the small lines in the grayscale bar show the historical movement of the relevance, where the length and position of the line shows the historical magnitude of movement since the last evaluation and the arrow shows the aggregate movement and indicates direction. In an embodiment, several arrows and lines may be displayed showing change over time.

It is noted that any graphical representation of the collection of content as a whole may be used, such as an oval, a circle, a square, and octagon, etc. Embodiments of the invention are not tied to any particular graphical representation. Moreover, as discussed above the presentations can be customized, interactive, and composite presentations having one presentation overlaid on another presentation.

It should also be pointed out that the relevancy can be related to content supplied by users with regarded to a help desk issue or problem. This can assist in visually seeing where the problem is likely to be and for evaluating the input by particular users to the problem. The novel graphical presentations provide a mechanism to assist help desk personnel in quickly identifying issues from a pool of feedback and ranking that feedback in a succinct manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:

evaluating a collection of content against a relevancy statement, the collection of content is electronic discussions or threads for or about a particular resource that is a custom-defined topic or subject, and the collection of content is culled from the Internet, private or personal repositories of content, virtual communities, and combinations of data from the Internet, the private or personal repositories of content, and the virtual communities;

scoring components of the collection of content with relevancy values in view of evaluation of the relevancy statement, each component referring to a particular authored piece of content that belongs to the collection of content, the particular authored piece of content is viewed as a contribution made by a particular author to the custom-defined topic or subject, and each relevancy value refers to a numerically assigned value or unique string belonging to a predefined scale of available values that is assigned to a particular component in view of the relevancy statement, the relevancy statement is a confidence factor that each particular component originates from a particular identity for the particular author, a collection of identities known to be assumed by the particular author, and/or selective identities for a group of users or an organization that the particular author belongs to, and the relevancy statement includes an accuracy factor that each particular component is more or less relevant to the custom-defined topic or subject, and each relevancy value representing a composite value for different relevancy factors; and representing the components with their relevancy values vis-à-vis the collection of content as a whole as a presentation for subsequent analysis.

2. The method of claim 1, wherein evaluating further includes identifying the relevancy statement as one or more of the following: an identity of a user that contributed the components to the collection of content, multiple personas of the user that the user used to contribute the components, and a selective list of group identities for multiple different users that contributed the components to the collection of content.

3. The method of claim 1, wherein evaluating further includes identifying the relevancy statement as a search that is periodically processed over a network or virtual community to form the collection of content.

4. The method of claim 1, wherein scoring further includes representing each relevancy value associated with each component as: a particular author of the components and that particular component's relevancy to the collection of content, a present aggregate value representing an aggregated amount of movement in a particular relevancy value presently being assigned vis-à-vis a last assigned aggregate value associated for a last relevancy value, and a historical movement value representing another amount for a historical value for relevancy of the components contributed by the particular author and other components of the collection of content contributed by other authors to the collection of content vis-à-vis a last assigned historical value.

5. The method of claim 1, wherein representing further includes creating a data structure to be provided as the presentation, the data structure including first portions representing the collection of content as a whole, second portions representing the components, and third portions representing the relevancy values tied to the components.

6. The method of claim 5, wherein representing further includes presenting each of the portions with a distinctive visual cue within the presentation.

7. The method of claim 6 further comprising, providing the presentation as an interactive presentation that when different portions are activated by a user via a selection device enhanced details for each activated portion are also displayed with the presentation.

* * * * *

UNITED STATES PATENT AND TRADEMARK OFFICE
CERTIFICATE OF CORRECTION

| | | |
|---|---|---|
| PATENT NO. | : 8,108,402 B2 | |
| APPLICATION NO. | : 12/253043 | |
| DATED | : January 31, 2012 | |
| INVENTOR(S) | : Carter | |

It is certified that error appears in the above-identified patent and that said Letters Patent is hereby corrected as shown below:

In column 7, line 34, delete "manager" and insert -- manage --, therefor.

In column 7, line 67, delete "wireless" and insert -- wireless. --, therefor.

Signed and Sealed this
First Day of May, 2012

David J. Kappos
*Director of the United States Patent and Trademark Office*